March 20, 1962     E. APPELT     3,025,948
CARRIER ASSEMBLY
Filed July 8, 1959
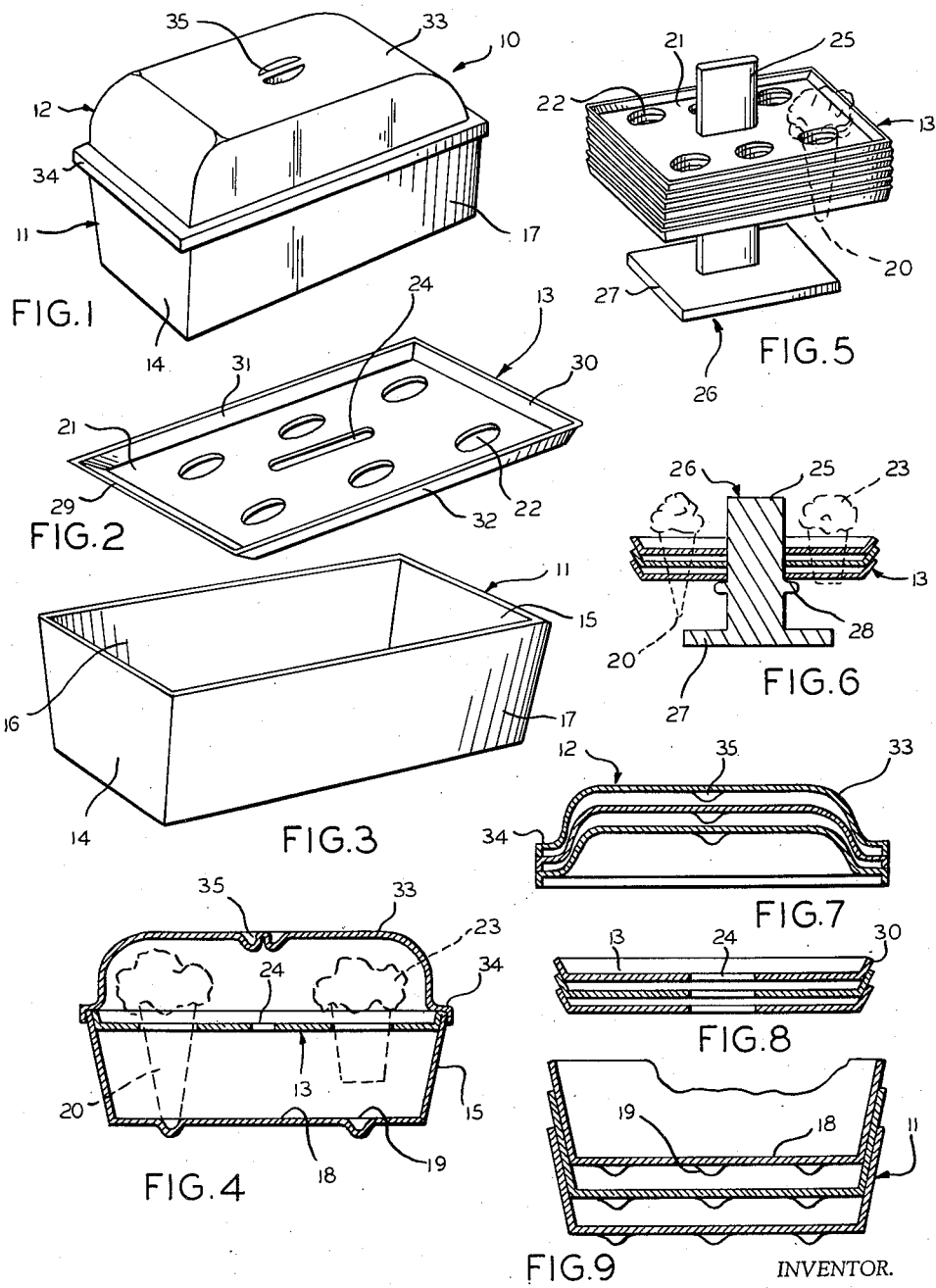
INVENTOR.
EDNA APPELT
BY John W. Graham
ATTORNEY

United States Patent Office 3,025,948
Patented Mar. 20, 1962

3,025,948
CARRIER ASSEMBLY
Edna Appelt, 2226-A E. Oklahoma Ave.,
Milwaukee, Wis.
Filed July 8, 1959, Ser. No. 825,749
1 Claim. (Cl. 206—4)

This invention relates to a container structure, and more particularly to a container or carrier assembly useful in carrying individual ice cream cones, cups and the like from one location to another.

It is quite common for one person to order several individual servings of ice cream, custard and similar products, and to carry such servings from the sales counter to a remote location for consumption. A well known example of such an arrangement is the familiar drive-in restaurant whereat a waitress or one of the occupants of the automobile carries the food products from the serving counter to the automobile. Both the dispensing and carrying of ice cream and custard cones and cups, coffee and other beverages, are of considerable inconvenience for it is very difficult to handle several individual servings of such commodities at the same time as a consequence of the inherent instability of the containers and likelihood of spillage, etc. of the food products.

Therefore, it would be advantageous to have available a container or carrier structure which could be used by a clerk to receive and support the individual servings as they are prepared so that he could deal with but one at a time, and which subsequently could be used by the customer to carry such servings to a remote location; and it is an object of this invention to provide such a structure.

Another object of the invention is in the provision of a sectional container or carrier structure in which the component parts thereof have individual utility as well as utility in the composite for receiving, supporting and carrying edibles of the type described. Still another object is that of providing a container or carrier structure adapted for use in connection with individual servings of ice cream, custard, pottable liquids, etc., and in which the various components of the structure are adapted to nest, respectively, with the corresponding components of additional carrier structures so as to conserve space during storage and shipment thereof.

A further object is that of providing a structure of the character described, in which one of the components thereof constitutes a tray or carrier adapted to nest with corresponding trays to form a stack thereof supportable upon a stand to define a magazine therewith, in which individual cones and cups can be positioned in the uppermost tray of such stack as they are prepared for serving, and in which such uppermost tray can be thereafter lifted from the stack for direct transport or for interpositioning with the other components of the container structure for transport.

Yet a further object is in the provision of a container structure of the type described which is simple and economical, is easy to use and which, where desired, permits the food products to be completely enclosed during transport thereof. Additional objects and advantages of the invention will become apparent as the specification develops.

An embodiment of the invention is illustrated in the accompanying drawing, in which—

FIGURE 1 is a perspective view of a container or carrier structure embodying the invention, and in which the container is closed;

FIGURE 2 is a perspective view of the tray or carrier element of the container structure;

FIGURE 3 is a perspective view of the bottom section of the container carton;

FIGURE 4 is a transverse sectional view taken through the closed container as illustrated in FIGURE 1, and in which an ice cream cone and a custard cup are shown in position therein in broken lines;

FIGURE 5 is a perspective view of a stack of the trays shown in FIGURE 2, nested one within another and supported upon a stand therefor;

FIGURE 6 is a longitudinal sectional view of the stand and stack of trays illustrated in FIGURE 5;

FIGURE 7 is a longitudinal sectional view of a plurality of nested cover sections;

FIGURE 8 is a longitudinal sectional view of a stack of nested trays; and

FIGURE 9 is a longitudinal sectional view of a stack of nested bottom sections of the carton.

The container or carrier structure in its entirety is designated with the numeral 10, and comprises a carton having body or bottom section 11, a cover 12 therefor, and a tray or carrier element 13 adapted to be positioned interiorly of the carton, as shown in FIGURE 4. The general geometric configuration of the container structure may take varied form and, for example, may be circular or square-shaped as well as rectangular as shown. The container structure may be made of various materials such as plastic, pressed paper, fibers, etc., but preferably is relatively waterproof.

The bottom section 11 of the carton has end walls 14 and 15, side walls 16 and 17, and a bottom wall 18. The end walls and side walls diverge upwardly and outwardly, whereupon a plurality of the carton sections 11 can be nested one within another as shown in FIGURE 9, so that a relatively large number thereof can be stored and shipped compactly. As seen in FIGURES 4 and 9, the bottom wall 18 of the carton section 11 is provided with a plurality of depending recesses or indentations 19 which are adapted to receive the tip of a conventional ice cream cone 20 therein to stabilize the same during transport of the filled container. The recesses 19 are oriented in aligned rows, and in the specific illustration two spaced apart, longitudinally extending rows are provided, each of which comprises three such recesses. Consequently, a total of six recesses is provided in the carton section 11. The deformations of the bottom wall 18 of the carton section 11 resulting from the recesses 19 project outwardly from the bottom wall and serve as feet which support the bottom section 11 and afford a cushioning action therefor.

The tray or carrier 13 has a generally planar surface or table portion 21 provided with a plurality of apertures 22 formed therein. The apertures 22 are respectively aligned with the recesses 19 in the carton section 11, and consequently are oriented in two longitudinally extending rows each of which has three such apertures therein. In the specific illustration, the apertures 22 are circular and therefore accommodate the cones 20 or custard cups 23. Centrally the planar surface 21 is provided with a medially oriented, longitudinally elongated slot 24 adapted to slidably receive a standard 25 of a stand 26 which has a base 27 supporting the standard 25 thereon. As is evident in FIGURE 6, the standard 25 is equipped intermediate the ends thereof with outwardly extending protuberances 28 which may be in the form of a perimetric rib adapted to seat one or more trays 13 thereon and thereby support the same. It will be noted that the rib 28 is oriented so that if a single tray 13 is supported thereon, such tray will accommodate a cone 20 positioned in an aperture 22 thereof. It will be apparent that the rib 28 could be a separate element biased upwardly by a spring or comparable means to position the uppermost tray 13 in any stack thereof near the top of the standard.

The tray 13 is equipped with upwardly extending edges or wall portions that are inclined outwardly so that a plurality of the trays can be nested one within another, as illustrated in FIGURES 5, 6, and 8. For identification, the end walls of the tray are denoted with the numerals 29 and 30 and the side walls as 31 and 32. The angular inclination of the wall portions of the tray 13 is substantially the same as the angular disposition of the walls of the carton section 11 so that the tray 13 can be positioned therein, as shown in FIGURE 4. When the tray is so inserted into the carton section, the apertures 22 are disposed in respective vertical alignment with the recesses 19 so that each cone 20 supported by a tray has the tip thereof positioned in a recess 19.

The cover 12 of the carton is relatively deep so that it will not touch the ice cream or custard contained within a cone 20 or cup 23. Therefore, the cover has upwardly extending wall members that merge into a top wall 33. As shown in FIGURES 1 and 4, the end walls may be rounded slightly to improve the appearance of the structure, and all of the upwardly extending walls should taper inwardly to some extent so that the covers can be stacked in nested relation as shown in FIGURE 7. The top wall 33 at substantially the midportion thereof is provided with a handle or finger grip 35. Also adjacent the bottom of the cover is a laterally extending perimetric flange 34 terminating in a depending lip that receives the upper edge of the bottom section 11 therein as well as the upwardly turned edges of the carrier element 13. Thus, the cover and bottom section define a substantially enclosed compartment when these elements are brought together.

While in the foregoing specification an embodiment of the invention has been set forth in considerable detail for purposes of adequately disclosing the same, it will be apparent to those skilled in the art that numerous changes may be made in such details without departing from the principles or spirit of the invention.

I claim:

A container structure, comprising a bottom section provided with a bottom wall and having diverging side and end walls extending upwardly therefrom whereby a plurality of said bottom sections can be nested one within another to form a stack thereof, a generally planar carrier element having upwardly diverging side and end walls whereby a plurality of said carrier elements can be nested one within another to form a stack thereof and having also a centrally disposed slot for receiving a vertically oriented standard so that such stack can be supported thereon, said carrier element being removably received within said bottom section with the respectively juxtaposed side and end walls of said bottom section and carrier element being in tight frictional engagement to wedgingly locate said carrier element in vertically spaced and substantially parallel relation with said bottom wall, said carrier element being provided with a plurality of openings therein for respectively supporting cones and the like and said bottom wall having a plurality of inverted cone-shaped depressions along the inner surface thereof respectively aligned with said openings and defining upwardly facing recesses for seating the tips of cones therein and defining also downwardly extending protuberances providing a resilient support for said container structure, and a cover having a top wall equipped with a centrally disposed handle structure and having end and side walls extending downwardly and outwardly from said top wall whereby a plurality of said covers can be nested one within another to form a stack thereof, said cover being equipped with a laterally extending perimetric flange terminating in a depending lip telescopically receiving the upper edge portion of said bottom section in covering the same.

References Cited in the file of this patent

UNITED STATES PATENTS

| | | |
|---|---|---|
| 966,661 | Daniels | Aug. 9, 1910 |
| 1,361,364 | Burlingham | Dec. 7, 1920 |
| 1,560,938 | Lund | Nov. 10, 1925 |
| 2,584,787 | Castle | Feb. 5, 1952 |
| 2,771,232 | Reed | Nov. 20, 1956 |
| 2,795,323 | Amundsen | June 11, 1957 |
| 2,944,694 | Kinsey | July 12, 1960 |